United States Patent
May et al.

(10) Patent No.: US 7,913,299 B2
(45) Date of Patent: Mar. 22, 2011

(54) SYSTEMS, METHODS AND COMPUTER PROGRAM PRODUCTS FOR FIREWALL USE OF CERTIFIED BINARIES

(75) Inventors: Alan D. May, Winchester, KY (US); Jeffery A. Miller, Paris, KY (US); Malissa G. Sullivan, Versailles, KY (US)

(73) Assignee: International Business Machines Corporation, Armonk, NY (US)

(*) Notice: Subject to any disclaimer, the term of this patent is extended or adjusted under 35 U.S.C. 154(b) by 725 days.

(21) Appl. No.: 11/962,941

(22) Filed: Dec. 21, 2007

(65) Prior Publication Data
US 2009/0165113 A1    Jun. 25, 2009

(51) Int. Cl.
*G06F 17/00* (2006.01)
(52) U.S. Cl. ............ 726/11; 713/156; 713/176; 380/52; 380/287
(58) Field of Classification Search .................... 726/11; 713/156, 176; 380/287, 52
See application file for complete search history.

(56) References Cited

U.S. PATENT DOCUMENTS

| | | | |
|---|---|---|---|
| 5,343,527 A | 8/1994 | Moore | |
| 6,742,121 B1 | 5/2004 | Safadi | |
| 7,093,132 B2 | 8/2006 | Aho et al. | |
| 7,503,064 B2 * | 3/2009 | Saltz | 726/11 |
| 2002/0174338 A1 | 11/2002 | Tomita et al. | |
| 2006/0075478 A1 * | 4/2006 | Hyndman et al. | 726/11 |

FOREIGN PATENT DOCUMENTS

EP    1420323 A1    5/2004

* cited by examiner

*Primary Examiner* — Krisna Lim
(74) *Attorney, Agent, or Firm* — Cantor Colburn LLP; Ayla Lari

(57) ABSTRACT

Systems, methods and computer program products for firewall use of certified binaries. Exemplary embodiments include a method including reading a plaintext component from a digital signature, searching the plaintext component for an identifier, reading in a TotalTCPIPPorts field for a total number of sockets to be opened for an application, reading in ports and descriptions for each of the ports, displaying information from the plaintext component up to a block including the identifier, the port being opened and the port description, prompting an instruction, displaying on the screen information from the plaintext component up to a block including the identifier, displaying a warning that the application is opening additional ports beyond the default number specified displaying a warning that opening the additional ports should be avoided and prompting the instruction.

3 Claims, 2 Drawing Sheets

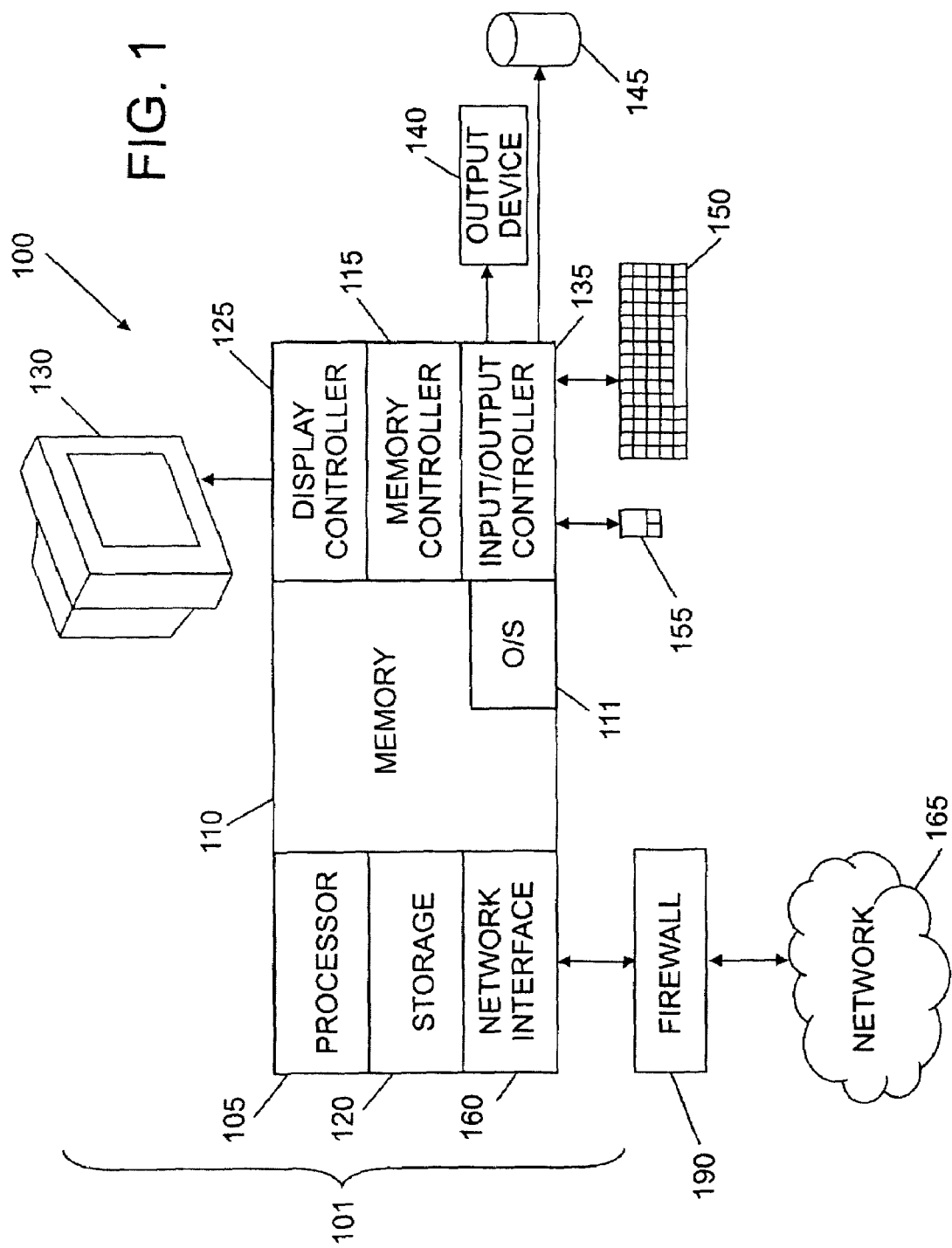

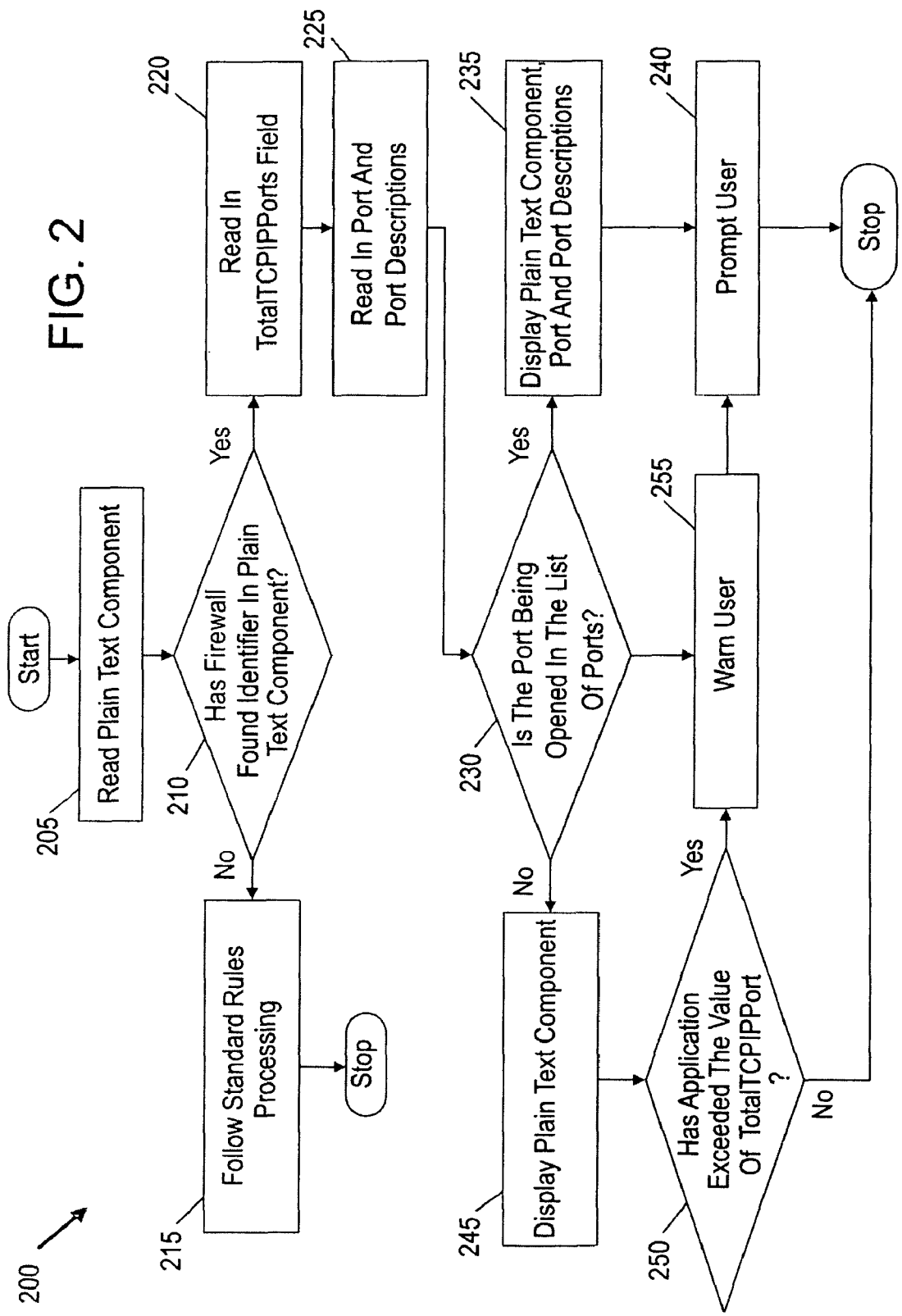

SYSTEMS, METHODS AND COMPUTER PROGRAM PRODUCTS FOR FIREWALL USE OF CERTIFIED BINARIES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to firewalls, and particularly to systems, methods and computer program products for firewall use of certified binaries.

2. Description of Background

Novice users typically do not know how to use a software-based firewall to secure their desktop and laptops from hackers. In addition, most novice users are not familiar with TCP/IP port settings or firewalls. Often they find themselves clicking the "Allow Port" without the knowledge to know if they are performing the correct actions. Novice users lack the knowledge to know if they should trust an executable to open a port, or to know what the port will be used for if they do.

SUMMARY OF THE INVENTION

Exemplary embodiments include a method for firewall use of certified binaries, the method including reading a plaintext component from a digital signature, searching the plaintext component for an identifier to indicate it contains a firewall information block, in response to finding the identifier, reading in a TotalTCPIPPorts field for a total number of sockets to be opened for an application, reading in ports and descriptions for each of the ports, in response to a port being opened being present in a list of ports, displaying on the screen information from the plaintext component up to a block including the identifier, the port being opened and the port description, prompting an instruction on the screen, in response to a port being opened being absent in a list of ports displaying on the screen information from the plaintext component up to a block including the identifier in response to a determination that the application has exceeded a value of the TotalTCPIPPorts displaying a warning on the screen that the application is opening additional ports beyond the default number specified displaying a warning on the screen that opening the additional ports should be avoided unless they have modified the configuration of this application to use a port or additional ports than by default and prompting the instruction on the screen.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which provides systems, methods and computer program products using information such as company, product, version, and date for display by firewalls when prompting the user to allow or disallow networking access to an application. In addition, or the firewall can automatically make the decision based on the source company's credentials for the executable. Additional fields consisting of the number of TCP/IP ports, the default port numbers, and descriptions of each port's usage should be added to the Authenticode signature.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 illustrates an exemplary embodiment of a system for firewall use of certified binaries; and FIG. 2 illustrates a flow chart for a method for firewall use of certified binaries in accordance with exemplary embodiments.

The detailed description explains the preferred embodiments of the invention, together with advantages and features, by way of example with reference to the drawings.

DETAILED DESCRIPTION OF THE INVENTION

In exemplary embodiments, application executables are signed with Authenticode digital signature. Furthermore, signatures originate from a Certificate Authority and may contain information such as company, product, version, and date. This information can be used in additional ways that it currently being implemented. For example, the information could be displayed by firewalls when prompting the user to allow or disallow networking access to an application, or the firewall could automatically make the decision based on the source company's credentials for the executable. Additional fields consisting of the number of TCP/IP ports, the default port numbers, and descriptions of each port's usage should be added to the Authenticode signature.

In exemplary embodiments, the following additional blocks of information can be added to the certification providing firewalls with this information to allow them to better inform users whether to allow this activity: 1) Number of ports the process will open; and 2) A list of each port number and a description of its use. In addition, this information could be used by: 1) the end user to identify the source of an application when prompted by a firewall to allow the application access to the network; 2) a firewall to automatically decide whether to allow an application access to the network based on company; and 3) a firewall to automatically decide whether to allow an application access to the network based on its certificate's declared needed ports and the actual port requested.

In exemplary embodiments, firewalls are able to provide the following checks: 1) that the binary is signed correctly, and if not, an indicator that the binary either was not signed, or has been tampered with by a virus or trojan attack; 2) that the binary is opening a port not in its certification list, and if so, indicate to the user the application is trying to open a non-default port, prompt if the user has modified the default setting; and 3) that the binary is opening additional ports above its indicated number of ports, and if so, an indicator the binary may not be trusted.

In exemplary embodiments, firewalls by using a certification, can perform the following: 1) allow a user to trust a company, if all port information matches the certification; and 2) monitor applications that had valid certifications that no longer have valid certifications as possibly being infected or corrupted. In addition, firewalls requesting approval from a user would be able to provide a description of the ports use.

FIG. 1 illustrates an exemplary embodiment of a system 100 for firewall use of certified binaries. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more busses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the firewall methods described herein in accordance with exemplary embodiments and a suitable operating system (OS) 111. The operating system 111 essentially controls the execution of other computer programs, such as the firewall systems and methods described herein, and provides scheduling, input-output control, file and data management, memory management, and communication control and related services.

The firewall methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the firewall methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals. In exemplary embodiments the system 100 can include a firewall 190 as further described herein.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The firewall methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The firewall methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the firewall methods are implemented in hardware, the firewall methods described herein can implemented with any or a combination of the following technologies, which are each well known in the ant: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In exemplary embodiments, the addition of a plaintext component to the digital signature of a signed executable can be implemented to a variety of ways. The following illustrate examples of the plaintext representation.

EXAMPLE 1

Plaintext Firewall Component for an Application that Opens no TCP/IP Ports

Firewall TCP/IP Component \r\n
TotalTCPIPPorts: 0 \r\n

EXAMPLE 2

Plaintext Firewall Component for an Application that Opens a Single TCP/IP Port

Firewall TCP/IP Component \r\n
TotalTCPIPPorts: 1 \r\n
1533: Default port used for Community connections to a Sametime Server. This port is required to be open to allow the Sametime Server to host chat and meetings. IBM recommends always allowing this port. \r\n

EXAMPLE 3

Plaintext Firewall Component for an Application that Open 3 TCP/IP Ports

Firewall TCP/IP Component \r\n
TotalTCPIPPorts: 3 \r\n

9092: Default port used by a Sametime Event Server, this provides event information between processes, allowing interprocess communication. IBM recommends always allowing this port. \r\n
9094: Default port used for remote authentication by a Sametime Server. This allows authentication against a Sametime Server for 3rd party applications. IBM recommends only allowing this port if you have installed 3rd party applications that work with Sametime. \r\n
8088: Default port use for T.120 data connections from the Meeting Room client to the server. IBM recommends always allowing this port. \r\n The previous examples illustrate how the data is stored in the Plaintext component of the digital signature. The following indicate the actions the firewall takes, when this application attempts to open a TCP/IP port on the system. FIG. 2 illustrates a flow chart for a method 200 for firewall use of certified binaries in accordance with exemplary embodiments. At block 205, the firewall 190 reads the plaintext component from the digital signature. At block 210, the firewall 190 searches the plaintext component for the identifier "Firewall TCP/IP Component \r\n" to indicate it contains a firewall information block. If at block 210 the firewall 190 does not find the identifier, then processing by firewall follows standard rules at block 215. If at block 210 the firewall 190 does find the identifier, then the firewall 190 reads in the TotalTCPIPPorts field for the total number of sockets this application should open at block 220. At block 225, the firewall reads in the ports and descriptions for each port. At block 230, the method 200 determines if the port being opened is in the list of ports. If at block 230, the port is in the list of ports then at block 235, the method 200 displays the information from the Plaintext component tip to the "Firewall TCP/IP Component \r\n" block, the port being opened, and the corresponding description. At block 240, the method 200 then prompts the user asking "Allow this time only", "Always Allow", "Never Allow", "Not this time", "Always allow this Signer", "Never Allow this Signer". If at block 235, the port is not in the list of ports, then at block 245, the method 200 displays the information from the Plaintext component up to the "Firewall TCP/IP Component \r\n" block. At block 250, the firewall 190 determines if the application has already exceeded the value of TotalTCPIPPorts in ports opened. If the application has exceeded the value of TotalTCPIPPorts in ports opened at block 250 yes, then at block 255, the method 200 warns user application is opening additional ports beyond the default number specified, and warns the user they should not allow this, unless they have modified the configuration of this application to use a port or additional ports than by default. Then at block 240, the method 200 prompts the user asking "Allow this time only", "Always Allow". "Never Allow", "Not this time", "Always allow this Signer", "Never Allow this Signer".

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system having a screen, a method for firewall use of certified binaries, the method comprising:
    reading a plaintext component from a digital signature;
    searching the plaintext component for an identifier to indicate it contains a firewall information block;
    in response to finding the identifier:
        reading in a TotalTCPIPPorts field for a total number of sockets to be opened for an application;
        reading in a plurality of ports and descriptions for each of the plurality of ports;
    in response to a port being opened being present in a list of ports:
        displaying on the screen information from the plaintext component up to a block including the identifier, the port being opened and the port description;
        prompting an instruction on the screen;
    in response to a port being opened being absent in a list of ports:
        displaying on the screen information from the plaintext component tip to a block including the identifier;
    in response to a determination that the application has exceeded a value of the TotalTCPIPPorts:
        displaying a warning on the screen that the application is opening additional ports beyond the default number specified;
        displaying a warning on the screen that opening the additional ports should be avoided unless they have modified the configuration of this application to use a port or additional ports than by default; and
        prompting the instruction on the display.

2. The method as claimed in claim 1 wherein the identifier is in the form: Firewall TCP/IP Component \r\n.

3. The method as claimed in claim 2 wherein prompting an instruction on the display is selected from the group consisting of: "Allow this time only", "Always Allow", "Never Allow", "Not this time", "Always allow this Signer", and "Never Allow this Signer".

* * * * *